United States Patent
Monga et al.

(10) Patent No.: US 7,706,034 B2
(45) Date of Patent: Apr. 27, 2010

(54) MULTI-DIMENSIONAL LOOK-UP TABLE GENERATION VIA ADAPTIVE NODE SELECTION BASED UPON COLOR CHARACTERISTICS OF AN INPUT IMAGE

(75) Inventors: Vishal Monga, Webster, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 253 days.

(21) Appl. No.: 11/853,652

(22) Filed: Sep. 11, 2007

(65) Prior Publication Data

US 2009/0067017 A1 Mar. 12, 2009

(51) Int. Cl.
*G03F 3/08* (2006.01)
(52) U.S. Cl. .................. 358/520; 358/1.9; 358/522; 358/523; 358/528; 382/162; 382/167; 345/600; 345/601
(58) Field of Classification Search .................. 358/1.9, 358/518, 520, 522, 523; 382/162, 167; 345/600, 345/601
See application file for complete search history.

(56) References Cited

U.S. PATENT DOCUMENTS

| | | | |
|---|---|---|---|
| 6,266,165 B1 * | 7/2001 | Huang et al. ................ 358/520 |
| 6,360,007 B1 * | 3/2002 | Robinson et al. ............ 382/162 |
| 6,650,771 B1 * | 11/2003 | Walker ........................ 382/162 |
| 2002/0097912 A1 * | 7/2002 | Kimmel et al. ............. 382/199 |
| 2004/0169889 A1 * | 9/2004 | Sawada ........................ 358/2.1 |
| 2005/0264836 A1 * | 12/2005 | Gotoh et al. ................. 358/1.9 |
| 2007/0132800 A1 * | 6/2007 | Huang et al. .................. 347/19 |
| 2007/0268534 A1 * | 11/2007 | Duan et al. .................. 358/520 |
| 2008/0174608 A1 * | 7/2008 | Mahy et al. ................. 345/604 |

* cited by examiner

*Primary Examiner*—Mark K Zimmerman
*Assistant Examiner*—Miya J Cato
(74) *Attorney, Agent, or Firm*—Philip E. Blair; Philip Blair & Associates (57) ABSTRACT

What is provided is a system and method for node set construction and look-up table generation to transform image data in the form of color values of an input color image in an input color space to an output color space of an image output system. In the present method, node locations are selected based upon an importance value generated by a significance function which describes a relative importance of a given color value in the input image or a region thereof. A distance weighting function is also provided which is applied to the significance function to balance the significance of a given node against a relative positioning of all other nodes in the multi-dimensional grid. Nodes can be added or deleted according to methods also described herein. Accordingly, a multi-dimensional look-up table is generated wherein node tiling is based upon a significance of color values of an input image.

18 Claims, 6 Drawing Sheets

MULTI-DIMENSIONAL LOOK-UP TABLE GENERATION VIA ADAPTIVE NODE SELECTION BASED UPON COLOR CHARACTERISTICS OF AN INPUT IMAGE

TECHNOLOGY

The present invention relates to systems and methods for multi-dimensional look-up table generation via adaptive node selection based upon color characteristics of an input image.

BACKGROUND

An image prepared for rendering on an electronic device is represented by a set of pixels that each describes a small portion of the image in terms of digital values that represent the colorants available to the rendering device. For example, in an image prepared for display on a video monitor, each pixel typically describes the intensity of the red (R), green (G) and blue (B) components of light that are illuminated to reproduce the color at the associated region of the screen. Similarly, in an image prepared for rendering on a printing device operating in a CMYK color space, each pixel describes the amount of cyan (C), magenta (M), yellow (Y) and black (K) colorants to applied to the print medium in order to reproduce the color at the associated region of the rendered image.

In an 8-bit system, the pixel value for each colorant can range from 0 to 255, with 255 representing the maximum or fully saturated amount of colorant. For an RGB color space, for example, fully saturated red is represented by the pixel value R=255, G=0, B=0 and ideally, a printer operating in a CMYK color space, for example, would reproduce the fully saturated red in response to the pixel value C=0, M=255, Y=255, K=0. In other words, the magenta and yellow colorants, when combined through simple subtractive mixing, would be perceived as red.

However, the spectral properties of the red phosphor used in the video monitor typically differ from those of the subtractively mixed magenta and yellow colorants of a particular printer. As a result, the visual appearance of the red described in RGB space and displayed on the video monitor will usually not match that of the red described in CMYK space and printed on a page. Further, even when rendered on different devices of the same type (e.g., two CMYK printers), the colors reproduced in response to the same color value (e.g., CMYK) will often differ in visual appearance. Accordingly, color transformations are typically required when color matching between two rendering devices is required. In the example described above, the saturated red pixel with RGB color value 255, 0, 0 may be mapped to a CMYK printer pixel that represents, for example, magenta and/or yellow that is less than fully saturated and also calls for a small cyan component, e.g., C=27, M=247, Y=255, K=0.

Color transformations are often complex, multidimensional functions that correct for the nonlinear behavior of both digital color devices and the human visual system, which would require a significant amount of memory in order to process large images in real-time. To reduce the computational cost, these functions are typically implemented as multidimensional lookup tables. A look-up table is essentially a rectangular grid that spans the input color space of the transform. Output values corresponding to each node, i.e., intersection point, of the grid are pre-computed and stored in the look-up table. Input colors are processed through the look-up table by i) retrieving the cell to which the input color belongs, and ii) performing an interpolation among a subset of the surrounding cell vertices to compute the output color value.

The size of a look-up-table is typically limited by the amount of available processor RAM and cache memory. Accordingly, look-up tables are built with an input node sampling that is as sparse as is practical under the circumstances. For example, while a 24-bit RGB vector would be capable of describing over 16 million colors, it would not be unusual for the corresponding RGB-to-CMYK look-up table to be partitioned into 16×16×16 table locations or nodes, with one CMYK value stored at each node. CMYK values of points not directly represented by nodes are then determined by interpolation among nodes or some other suitable calculation and thus, the issue of "node placement" becomes very important.

In spite of this significance, however, input nodes are typically positioned on a uniformly spaced lattice and even. In cases where the nodes are adapted to lie on a non-uniform lattice, node locations are usually selected based on the curvature of the function that describes the multi-dimensional transform. Simple mathematical operators such as the second derivative can be used to yield a measure of curvature. However, even in those scenarios, the distribution or relative importance of the values of the input values is usually ignored, which often leads to poor node placement and consequently, to inaccurate transforms.

Techniques for "truly optimal" node placement are search based and hence very intensive in computation. That is, the identification of truly optimal locations of a lattice for the placement of the nodes of a multi-dimensional look-up table would entail a search on all candidate nodes to eliminate as many locations as possible for optimal memory/cost reduction while maintaining the accuracy of the required color transformations. Since the set of candidate nodes in general is very large, particularly for high-dimensional inputs, a search of every node would also be very expensive and thus, is an impractical solution.

BRIEF SUMMARY

What is provided is a system and method for node set construction and look-up table generation to transform image data in the form of color values of an input color image in an input color space to color values of an output color space of an image output system. In the present method, node locations are selected based upon an importance value generated by a significance function which describes a relative importance of a given color value in the input image or a region thereof. A distance weighting function, as described herein if further detail, is also provided which is applied to the significance function to balance the significance of a given node against a relative positioning of all other nodes in the multi-dimensional grid. Nodes can be added according to methods also described herein. Accordingly, the present method produces a multi-dimensional look-up table wherein node tiling is based upon a significance of color values of an input image.

In one example embodiment, the present system and method for adaptive node selection based upon characteristics of an input image, involves performing the following. First, image data representing an input image is received from an image acquisition system. The image data is a set of input values, given by set S, of color values of the input image or a region thereof. In various embodiments, the input values can be values for the most significant colors in the input image, values selected by a user based upon a visual inspection of the input image, values determined to be statistically representative of color values in the input image or a region thereof, or all input RGB values of the input image. Thereafter, a significance function p(x) is obtained which describes a relative importance of a transformation accuracy of input variables in the set S to a multi-dimensional look-up table. The significance function can be selected based upon a multi-dimensional probability distribution, i.e., a histogram of colors within a chosen subset of input values within S. The significance function can be a user-defined function that emphasizes certain colors, such as neutral colors and skin tones, for which a characteristic of an object influences a human perception of its color in favor for other colors. A distance weighting function is applied to the significance function. The distance weighting function serves to balance the significance function against a relative positioning of all nodes in the multi-dimensional look-up table. A significance value is then determined for input values in S using the distance-weighted significance function. Until a termination condition has been reached, the following are iteratively performed. (1) A location is identified wherein a current input value has a maximum significance; and (2) A node is selected at the identified location. Once the termination condition has been reached, a set of nodes N is constructed using the selected nodes. A look-up table is generated from the set of nodes N and the generated look-up table is provided to an image output system configured to generate a hardcopy output image based upon output values retrieved from the look-up table. The set of nodes N can be post-processed using additional methods provided herein. In one embodiment, nodes can be eliminate from a component dimension to achieve a minimum allowable node spacing along a $k^{th}$ dimension. In another embodiment, nodes can be added between two selected nodes in a component dimension to achieve a lattice of a desired size. Various embodiments have been disclosed.

DETAILED DESCRIPTION

Figure 1:
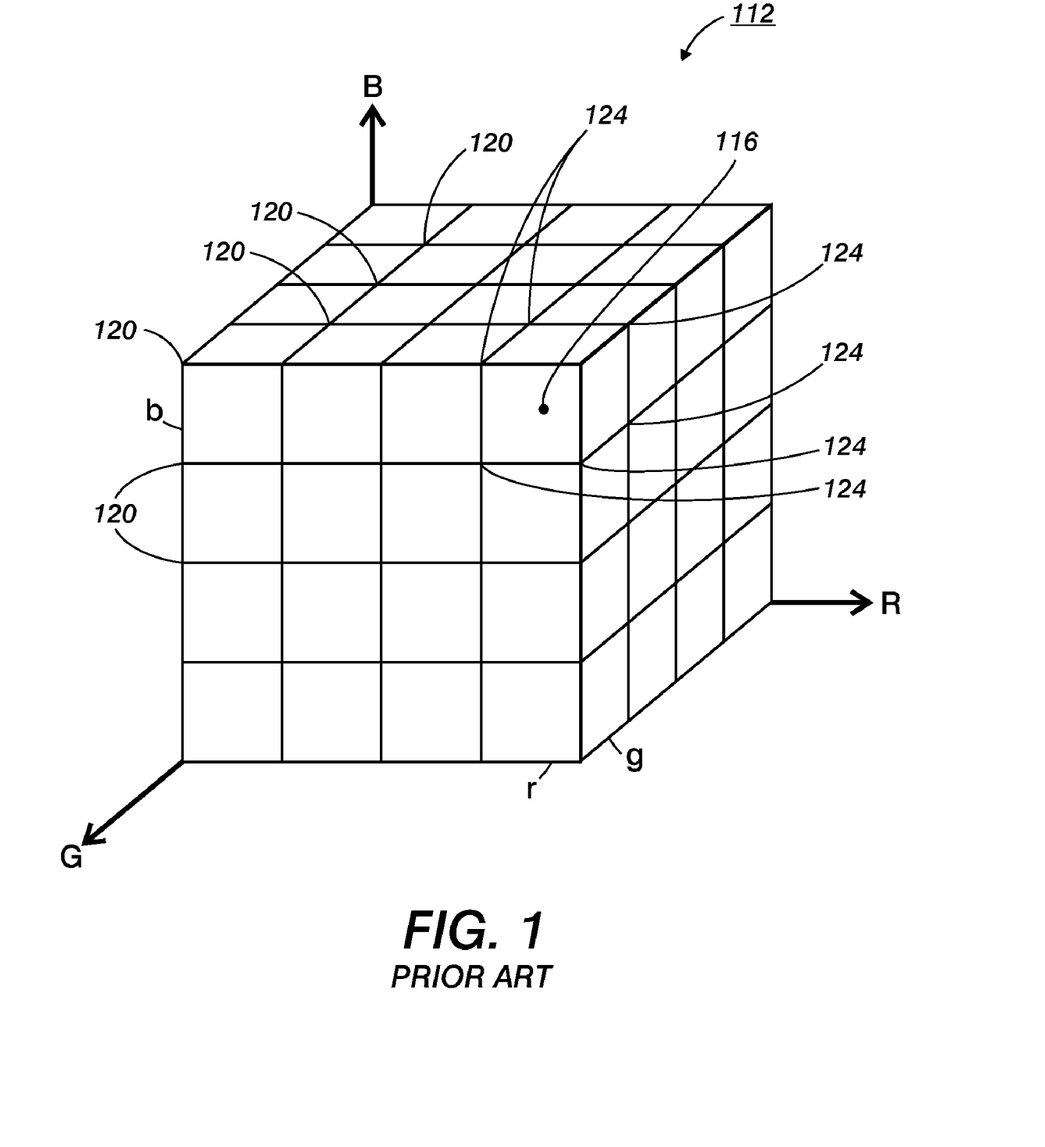
FIG. 1 is a depiction of a portion of a multi-dimensional look up table having uniform tiling.

FIG. 1 provides an example of the type of look-up table 112 that is commonly used for RGB to CMYK color transformations. An input RGB value is used to determine R, G and B index values that locate the transformation data within the table. Index values corresponding to the nodes 120 are used to directly access the color values that are pre-computed and stored at the respective node 120. Since, the index values corresponding to a point 116 do not coincide with any node location 120, i.e., a transformation value is not directly available from the table 112, the conversion is accomplished by interpolating between the CMYK values stored in nodes 124 at the vertices surrounding to the point 116. Since the input RGB color is defined in three dimensions, the interpolation is done in three dimensions. The RGB index values for look-up table 112 were generated via the quantization or "tiling" of the color space into equal, regularly sized and regularly shaped tiles. Accordingly, tiling in look-up table 112 is even and regular.

Figure 2:
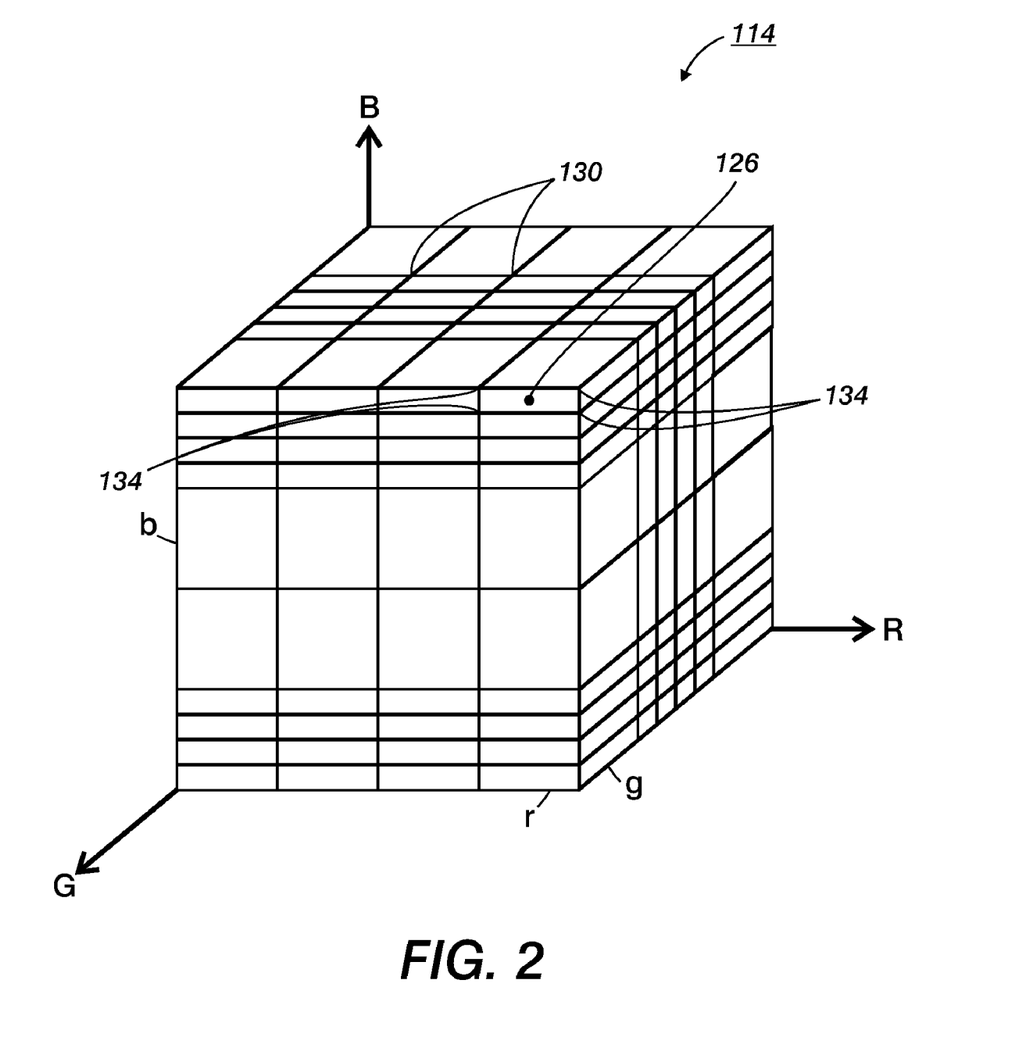
FIG. 2 is a depiction of a portion of a multi-dimensional look up table built using adaptive node selection.

Adaptive node selection provides a way to build a look-up table 114 such as that illustrated in FIG. 2, with nodes 130 selected based upon the characteristics of an input image. As before, an input RGB value determines index values r, g, b, which are used to locate the transformation data within the table 114 and the transformation value corresponding to point 126 is accomplished by interpolation, rather than by retrieving it directly from storage using a single index value. While tiling in look-up table 112 of FIG. 1 is even and regular, present systems and methods provide a look-up table 114 with tiling that is arranged based upon the characteristics of the input image. In the example shown, index values on the R axis are uniformly distributed, while the values on the G axis are concentrated toward the center of the input space and the values on the B axis are concentrated toward the ends. A look-up table such as that shown in FIG. 2 may be useful for transforming a color image with multiple shades of green at the center of the image.

Figure 3:
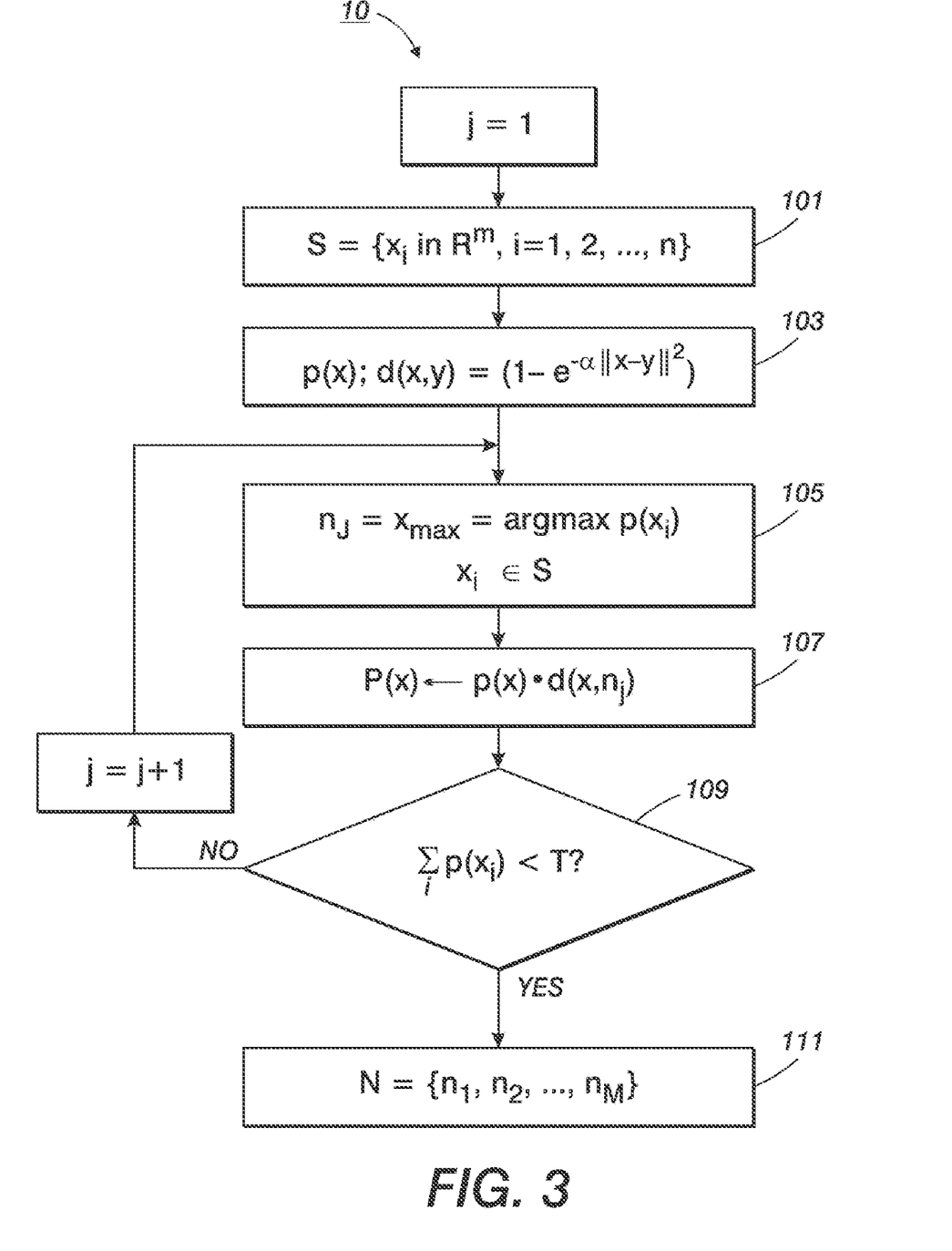
FIG. 3 is a flow chart showing a method of building a multi-dimensional lookup table using adaptive node selection.

Turning to FIG. 3, a method 10 of selecting node locations for a multi-dimensional look-up table 12 begins at block 101 with a set S of input values. Generally, S is a set of values in the input vector space V that are determined to be statistically representative of color values in the input image or a region thereof. In one aspect, S is a set of color values for the most significant colors in the input image. Set S may be selected in many different ways. For example, it may simply be the set of all possible input RGB values. In another aspect, S is selected by a user based upon a visual inspection of the input image. For example, if a large region of the image has one or more objects with the same color, the user may select S to increase the significance of that color during node selection to locate a higher number of nodes, and thus increase the accuracy of the color transformations, in the vicinity of that color. Thus, for a close up image of a red flower generated in an RGB color space, S may include color values 255, 0,0; 245, 0,30; 252, 0,45; 248, 0,60; 255, 0,90, etc that represent the different shades of red displayed in the flower petals.

In one aspect, present systems and methods then define a significance function p(x) and a distance weighting function d(x, y) at block 103. Generally, significance function p(x) determines the relative importance of a color x in set S, with "importance" defined in the context of the color transformation to be applied to the image. That is, with respect to the visual appearance of the image, how important it is to accurately transform that color. In one aspect, p(x) is selected based upon a multi-dimensional probability distribution, i.e., histogram, of colors x within the chosen subset S of input values, in which case, importance is dictated by the frequency of the colors within S. In another aspect, p(x) may be a user defined function that emphasizes certain memory colors, i.e., colors such as neutral colors and skin tones, for which the characteristic of an object influences the human perception of its color, in favor for other colors.

The distance weighting function of block 103 is selected such that:

$$d(x,y) \geq 0, \forall x,y \in V$$

$$d(x,y) = 0 \Leftrightarrow x = n_{max}$$

Distance weighting function d(x, y) serves to balance the significance function against the relative positioning of all of the nodes in look-up table 12. More specifically, the distance weighting function forces the significance of the just considered node to 0 so it will not be selected again and also, prevents nodes of look-up table 12 that are within a region of high significance from being positioned too closely together.

In one aspect, present systems and methods distance apply a function d(x, y) defined as:

$$d(x,y)=(1-e^{-\alpha\|x-y\|^2})$$

and the distance between adjacent nodes can be controlled by varying α. Generally, α is a positive, scalar value. Thus, for a given x and y, an increase in α will result in a decrease in $e^{-\alpha\|x-y\|^2}$ and cause d(x, y) to approach 1. In one aspect, the value of α may be specified by the user, e.g., based upon previous knowledge, trial and error, etc.

In one aspect, at block 107, method 10 identifies $x_{max}$, the location where the input has maximum significance. Generally, the identification of $x_{max}$ includes sorting the significance values for all of the inputs in the subset S, then selecting the input value where the significance value is the highest as the node.

It is understood that method 10 may select several node locations that are very close together, such as, for example for example when an image has two or more dominant colors that are very close in visual appearance, i.e. the color values could be stored at nodes that are separated by a very small distance in the multi-dimensional input space. Accordingly, in one aspect, present systems and methods provide P(x), a distance-weighted significance function of the input at block 109 by applying distance function d(x,$x_{max}$) to the significance function p(x) of block 105. More specifically, distance weighting function d(x,$x_{max}$) is applied to input significance p(x) to attach a "distance penalty" that prevents the nodes from being positioned in locations that are too close to $x_{max}$.

It is understood that the value of distance weighting function d(x,y) is generally dependent upon the characteristics of the image, i.e., d(x,y) has the biggest impact when an undesirable number of nodes would otherwise be positioned in very close proximity.

In one aspect, processing of method 10 may terminate when the number of high significance input locations that have been considered is sufficient. More specifically, in one aspect, present systems and methods cease processing when the area under the distance-weighted input distribution P(x) exceeds a threshold T, as indicated in block 111. Generally, the area under P(x) represents a rough estimation of the approximation error of look-up table 12. Thus, for a given input distribution p(x) and distance weighting d(x,y), the threshold T automatically determines the number of nodes selected through the process, i.e. smaller T results in a greater number of nodes. The processing of method 10 then concludes with constructing a set of nodes N.

As explained above, each node $n_j$ is a multi-dimensional vector, with component values $n_j(k)$ along the k-th dimension. Thus on some occasions, the projections of the nodes on-to their individual dimensions, i.e. the component values, may be coincident or very close to each other, even when the node vectors $n_j$ are sufficiently separated in multi-dimensional space. In such cases, additional processing to eliminate one or more nodes may be desirable.

Figure 4:
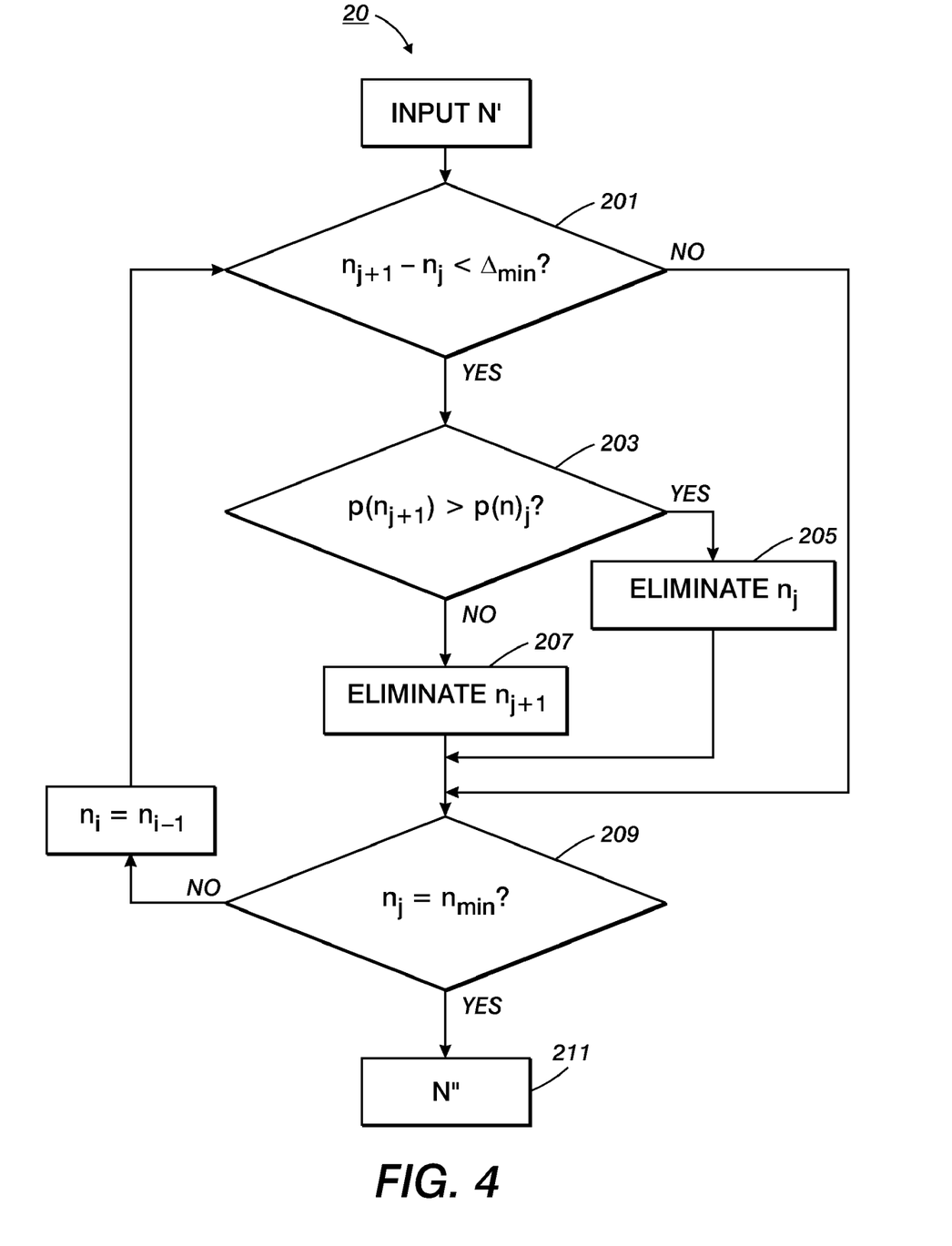
FIG. 4 is a flow chart showing a method of post processing for improved node spacing in a look-up table built using adaptive node selection.

FIG. 4 is a block diagram of a post-processing method 20 that may optionally be applied to the set of nodes N to eliminate nodes that are spaced too closely in look-up table 12. For example, saturated red, which is represented by RGB coordinates [255 0 0] and a strong magenta color, e.g., RGB coordinates [240 0 255] are quite different in both visual appearance and numerical value, but have very close red components. If an image containing both colors is rendered in a RGE3 color space, method 10 could include both values in the set of nodes N. Accordingly, in one aspect, method 20 may optionally be applied to eliminate one or more values from set N.

The following definitions are provided for the post-processing node elimination method 20 of FIG. 4;

M is the number of nodes selected prior to termination of method 10, i.e., $n_j$, j=1, 2, . . . , M;

$n_1, n_2, \ldots, n_m$ are the sorted scalar values of the nodes in the kth dimension, i.e., $n_1 \leq n_2 \leq \ldots n_M$;

$\Delta_{min}$ is the minimum allowable node-spacing along the kth dimension;

$n_{min}$ and $n_{max}$ are the "boundary values" that must be appended to the node vector, with $n_{min} \leq n_1$ and $n_{max} \geq n_M$; the set of M+2 nodes with boundary values added to the set N is denoted by N'.

$p_k(n)$ is the separable weighting function for the k-th dimension obtained from the joint multi-dimensional profile p(x);

$n_0 = n_{min}$ and $n_{m+1} = n_{max}$; and $p(n_{min}) = p(n_{max}) = 1$

The final assumption ensures that the boundary values will always appear in the final node selection.

In one aspect, method 20 first generates node set N' by adding boundary nodes $n_{min}$ and $n_{max}$ to node set N. Beginning with $n_j = n_{max}$, method 20 determines at block 201 whether the difference between $n_{j+1}$ and $n_j$ is less than $\Delta_{min}$. If not, the spacing between the node levels is sufficient, and method 20 determines at block 209 whether set N' has other nodes to be considered and if so, decrements the counter and returns to block 201 and determines whether $n_{j+1} - n_j$ is less than $n_{min}$ for the node with the next highest significance. If $n_{j+1} - n_j < \Delta_{min}$ at block 201, method 20 compares the value of the weighting function at $n_{j+1}$ to the value at $n_j$ at block 203. If $p(n_{j+1}) > p(n_j)$ at node level $n_j$, node level $n_{j+1}$ is retained and node level $n_j$ is eliminated as shown at block 205. Conversely, if $p(n_{j+1}) < p(n_j)$ node level $n_j$ is retained and level node $n_{j+1}$ is eliminated at block 207. In either case, method 20 determines at block 209 whether set N' has other nodes to be considered and if so, decrements the counter and performs the comparison of block 201 again for any remaining nodes. Once all nodes of set N' have been considered, method 20 generates a set N" of properly spaced look-up table nodes at bock 211.

There may also be cases in which the number of nodes generated by method 10 is too small for a desired application. For example, an application may require the number of node levels to be the same along each dimension or it may be necessary to impose constraints on the number of node levels for some other reason. Accordingly, it may sometimes be desirable to process the output of method 10 to add nodes.

Figure 5:
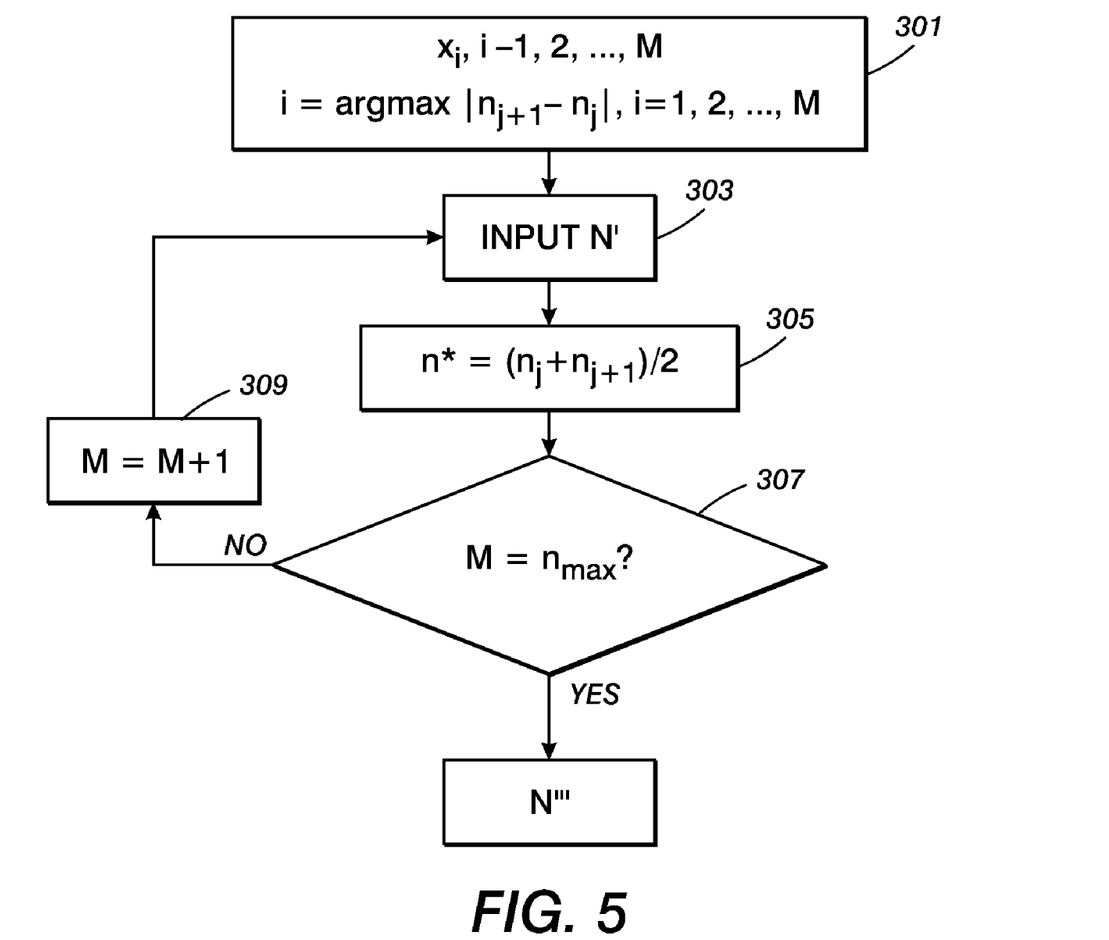
FIG. 5 is a flow chart showing a method of post processing to add nodes in a look-up table built using adaptive node selection.

As shown in FIG. 5, a post-processing method 30 may optionally be applied to P(x) to add nodes in one or more input dimensions of look-up table 12 such as, for example, to use ICC profiles, which require the same number of node levels along each dimension.

As before, M is the number of nodes selected prior to termination of method 10, i.e., $n_j$, j=1, 2, . . . M. Further, post-processing node addition method 30 of FIG. 4 also has:

$P_k$=the desired size of the look-up table in the kth dimension, k=1, 2, . . . m, wherein $P_k \geq M$, e.g., a 3-D input look-up table would make a lattice of size $P_1 \times P_2 \times P_3$, and nodes $n_1$ through $n_N$, are the sorted scalar values of the nodes in the kth dimension, with $N < P_k$:

In one aspect, method 30 first determines an index i such that i is in 1, 2, . . . , M and j=argmax|$n_{j+1} - n_j$|, i=1, 2, . . . , M at block 301. Method 30 inputs node set N' at bock 303 with boundary nodes $n_{min}$ and $n_{max}$ added to node set N. A node $n^*=(n_j, n_{j+1})/2$ is then inserted between $n_j$ and $n_{j+1}$ at block 305 and M is then incremented at block 307 to process the remaining nodes until $n^*=n_M$.

In one aspect, post-processing methods 20 and 30 may be performed separately in each dimension to obtain a final lattice of size $$\overset{m}{\underset{i=1}{L}} \Pi P_k$$

Present systems and methods may be useful, for example, in an application that attempts to match the colors of a legacy hardcopy. For example, a user with a hardcopy color proof that printed on an unknown print engine and a corresponding electronic file may wish to transform the colors in the electronic file to obtain a near exact reproduction of the hardcopy proof using an identified print engine.

Figure 6:
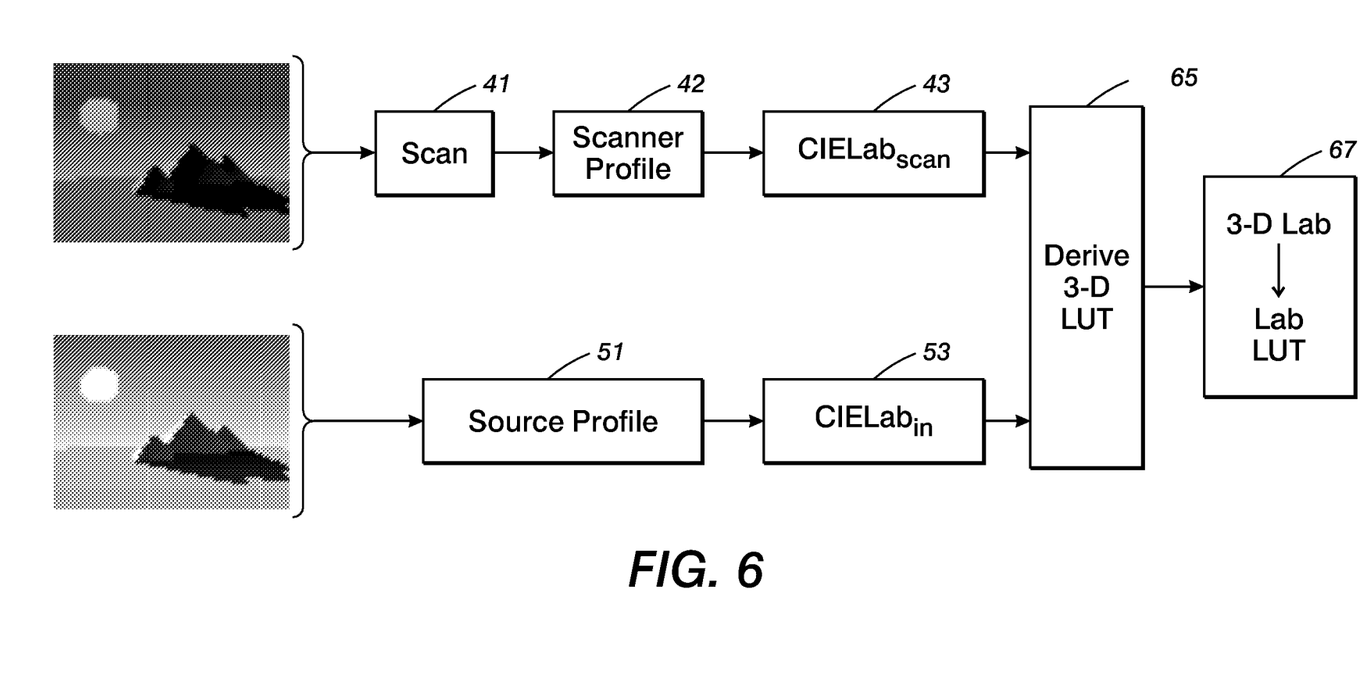
FIG. 6 is a block diagram showing the transformation a process for building an accurate color transformation look-up table from a source profile to a scanner profile.

FIG. 6 is a block diagram showing an example of how present systems and methods may be used to accomplish the desired color transformation. In one aspect, the hardcopy may be scanned at block 41 using a desktop scanner or other suitable device and a scanner profile is generated at block 42 to obtain device independent colors corresponding to the scanned file. In the example of FIG. 6, the device independent colors corresponding to the scanned image, identified as CIELabScan 43, are generated in the CIELab color space. It is understood, however, that other color spaces may also be used.

Similarly, at block 51, a source profile of the electronic original is processed to convert the electronic version of the image to the device independent color file CIELabIn 53. The goal is to then generate a look-up table that can be used to accurately transform data samples CIELabIn 53 to CIELabScan 43. The most crucial aspect of such a task is typically deriving the 3-D CIELabIn→CIELabScan look-up table 65 from the electronic file and the scanned data acquired from the proof being matched.

An image-adaptive color transformation such as that of the present systems and methods may be highly beneficial under these circumstances. Notably, the primary concern is the accurate reproduction of the colors in the image that correspond to those contained in the proof, which are likely to be sparsely or non-uniformly distributed in color space.

Present systems and methods maintain an access speed comparable to that of prior art look-up tables, yet avoid the disadvantage of using regularly spaced nodes by positioning look-up table nodes in locations that are selected based on a priori knowledge of the statistical distribution or other data defining significance of the input data. The computational burden imposed by use of such methods and systems is very small per iteration. In the case of a $M^m$ look-up table, the number of iterations required to process the entire image is proportional to M, where m is the dimensionality of the input variables.

It should be understood that the principles of the present system and method are applicable to a very wide range of apparatus, for example, copiers, facsimile machine, printers, scanners, and multifunction devices and that they are useful in machines that reproduce any type of image, e.g., black and white or color images that are generated by depositing ink, toner and other marking materials.

While present systems and methods have been described in conjunction with embodiments thereof, it is evident that many alternatives, modifications and variations will be apparent to those skilled in the art. It is appreciated that various of the above-disclosed and other features and functions, or alternatives thereof, may be desirably combined into other different systems or applications. Also, it is understood that various presently unforeseen or unanticipated alternatives, modifications, variations or improvements therein may be subsequently made by those skilled in the art which are also intended to be encompassed by the following claims.

What is claimed is:

1. A method for multi-dimensional look-up table generation via adaptive node selection based upon characteristics of an input image, the method comprising:

receiving, from an image acquisition system, image data representing an input image, said image data comprising a set S of input values of at least a region of said input image, said input values determined to be statistically representative of color values in said input image;

obtaining, from a significance function generator, a significance function describing a relative importance of a transformation accuracy of input values in S to a multi-dimensional look-up table useful for transforming said input values from an input color space to an output color space, said multi-dimensional look-up table comprising a multi-dimensional grid having a node located at each intersection thereof, output color values being stored at each node location, each node being accessible by an input index value, said input values being used to determine respective input index values;

applying, using a dampening function generator, a distance weighting function to said significance function to produce a distance-weighted significance function, said distance weighting function balancing said significance function against a relative positioning of all of nodes in said multi-dimensional look-up table, said distance weighting function controlling a distance between adjacent nodes and comprises:

$d(x,y) \geq 0, \forall x,y \in V$, and $d(x,y)=0 \Leftrightarrow x=n_{max}$;

and performing, using an image processing system:

determining a significance value for said input values in set S using said distance-weighted significance function;

sorting said significance values for all inputs in S;

for each of a predetermined number of nodes:

identifying a location in said multi-dimensional look-up table where the input value has a maximum significance value; and selecting a node at said identified location;

constructing a set of nodes N from said selected nodes;

generating a look-up table from said set of nodes N;

post-processing said set of nodes N to obtain any of a minimum spacing between nodes and a desired lattice size; and providing said generated look-up table to an image output system configured to generate a hardcopy output image based upon output values retrieved from said generated look-up table.

2. The method of claim 1, wherein said input values comprise any of:

values for the most significant colors in said input image;

values selected based upon a visual inspection of said input image; and all input RGB values of said input image.

3. The method of claim 1, wherein said significance function is a histogram of colors within a chosen subset of said input values, said importance being dictated by a frequency of colors within S.

4. The method of claim 1, wherein said significance function is a user defined function that emphasizes memory colors for which a characteristic of an object influences a human perception of its color in favor for other colors, wherein if a large region of said input image has one or more objects with a same color, said user selecting S to increase a significance of that color and thus increase an accuracy of color transformations in a vicinity of that color.

5. The method of claim 1, wherein said distance weighting function d(x, y) comprises:

$$d(x,y)=(1-e^{-\alpha\|x-y\|^2}),$$

where $\alpha$ is a positive, scalar value, and the distance between adjacent nodes being controlled by varying $\alpha$, such that, for a given x and y, an increase in $\alpha$ results in a decrease in $e^{-\alpha\|x-y\|2}$ and causes d(x, y) to approach 1.

6. The method of claim 1, wherein post-processing said set of nodes N to obtain said minimum spacing between nodes comprising eliminating at least one of said selected nodes to achieve a minimum allowable node spacing along a $k^{th}$ dimension.

7. The method of claim 6, wherein eliminating at least of said selected nodes comprises:
   wherein M is a number of nodes selected, $n_j$, j=1, 2, ..., M,
   wherein $n_1, n_2, ..., n_M$ are sorted scalar values of nodes in said $k^{th}$ dimension, such that: $n_1 \leq n_2 \leq ... n_M$,
   wherein $p_k(n)$ is a separable weighting function for said $k^{th}$ dimension obtained from a joint multi-dimensional profile p(x),
   wherein $n_0=n_{min}$ and $n_{m+1}=n_{max}$,
   wherein $p(n_{min})=p(n_{max})=1$,
   A) selecting $\Delta_{min}$ as a minimum allowable spacing along said $k^{th}$ dimension;
   B) adding boundary nodes $n_{min}$ and $n_{max}$ to node set N to obtain node set N';
   C) for each node in node set N', beginning with $n_j=n_{max}$:
      i) determining whether $n_{j+1}-n_j<\Delta_{min}$ for a node having a highest significance value, and if not, said spacing between node levels being sufficient; and
      ii) otherwise determining whether $p(n_{j+1})>p(n_j)$ at node level $n_j$, and if so retaining node level $n_{j+1}$ and eliminating node level $n_j$, otherwise retaining node level $n_j$ and eliminating node level $n_{j+1}$; and
   D) generating node set N" having said selected minimum allowable spacing.

8. The method of claim 1, wherein post-processing said set of nodes N to obtain a desired lattice size comprises adding at least one node between two of said selected nodes wherein a same number of nodes levels is required along a $k^{th}$ dimension.

9. The method of claim 8, wherein adding at least one node between two of said selected nodes comprises:
   wherein M is a number of nodes selected, node $n_j$, j=1, 2, ... M,
   wherein $P_k$ is a size of an input look-up table in said $k^{th}$ dimension such that $P_k \geq M$ makes a lattice of size $P_1 \times P_2 \times P_3$,
   wherein $n_1$ through $n_N$ are sorted scalar values of nodes along said $k^{th}$ dimension, with $N<P_k$,
   A) adding boundary values $n_{min}$ and $n_{max}$ to node set N to obtain node set N';
   B) repeating, for each node in node set N", until $n^*=n_M$:
      i) determining node $n^*=(n_j n_{j+1})/2$; and
      ii) inserting node $n^*$ between nodes $n_j$ and $n_{j+1}$; and
   C) generating a node set N''' having a final lattice of size:

$$\overset{m}{\underset{j=1}{L}} = \Pi P_k.$$

10. A system for multi-dimensional look-up table generation via adaptive node selection based upon characteristics of an input image, the method comprising:
   an image acquisition system configured to receive image data representing an input image, said image data comprising a set S of input values of at least a region of said input image, said input values determined to be statistically representative of color values in said input image;
   a significance function generator configured to provide a significance function describing a relative importance of a transformation accuracy of input values in S to a multi-dimensional look-up table useful for transforming said input values from an input color space to an output color space, said multi-dimensional look-up table comprising a multi-dimensional grid having a node located at each intersection thereof, output color values being stored at each node location, each node being accessible by an input index value, said input values being used to determine respective input index values;
   applying, using a dampening function generator, a distance weighting function to said significance function to produce a distance-weighted significance function, said distance weighting function balancing said significance function against a relative positioning of all of nodes in said multi-dimensional look-up table, said distance weighting function controlling a distance between adjacent nodes and comprises:

$$d(x,y) \geq 0, \forall x,y \in V, \text{ and } d(x,y)=0 \Leftrightarrow x=n_{max};$$

an image processing system configured to perform:
      determining a significance value for said input values in set S using said distance-weighted significance function;
      sorting said significance values for all inputs in S;
      for each of a predetermined number of nodes:
         identifying a location in said multi-dimensional look-up table where the input value has a maximum significance value; and
         selecting a node at said identified location;
      constructing a set of nodes N from said selected nodes; and
      generating a look-up table from said set of nodes N;
      post-processing said set of nodes N to obtain any of a minimum spacing between nodes and a desired lattice size; and
   an image output system configured to generate a hardcopy output image based upon output values retrieved from said generated look-up table.

11. The system of claim 10, wherein said input values comprise any of:
   values for the most significant colors in said input image;
   values selected based upon a visual inspection of said input image; and
   all input RGB values of said input image.

12. The system of claim 10, wherein said significance function is a histogram of colors within a chosen subset of said input values, said importance being dictated by a frequency of colors within S.

13. The system of claim 10, wherein said significance function is a user defined function that emphasizes memory colors for which a characteristic of an object influences a human perception of its color in favor for other colors, wherein if a large region of said input image has one or more objects with a same color, said user selecting S to increase a significance of that color and thus increase an accuracy of color transformations in a vicinity of that color.

14. The system of claim 10, wherein said distance weighting function d(x, y) comprises:

$$d(x,y) = (1 - e^{-\alpha \|x-y\|^2}),$$

where $\alpha$ is a positive, scalar value, and the distance between adjacent nodes being controlled by varying $\alpha$, such that, for a given x and y, an increase in $\alpha$ results in a decrease in $e^{-\alpha\|x-y\|2}$ and causes d(x, y) to approach 1.

15. The system of claim 10, wherein post-processing said set of nodes N to obtain said minimum spacing between nodes comprising eliminating at least one of said selected nodes to achieve a minimum allowable node spacing along a $k^{th}$ dimension.

16. The system of claim 15, wherein eliminating at least of said selected nodes comprises:
wherein M is a number of nodes selected, $n_j$, j=1, 2, ..., M,
wherein $n_1, n_2, \ldots, n_M$ are sorted scalar values of nodes in said $k^{th}$ dimension, such that: $n_1 \leq n_2 \leq \ldots n_M$,
wherein $p_k(n)$ is a separable weighting function for said $k^{th}$ dimension obtained from a joint multi-dimensional profile p(x),
wherein $n_0 = n_{min}$, and $n_{m+1} = n_{max}$,
wherein $p(n_{min}) = p(n_{max}) = 1$,
A) selecting $\Delta_{min}$ as a minimum allowable spacing along said $k^{th}$ dimension;
B) adding boundary nodes $n_{min}$ and $n_{max}$ to node set N to obtain node set N';
C) for each node in node set N', beginning with $n_j = n_{max}$:
  i) determining whether $n_{j+1} - n_j < \Delta_{min}$ for a node having a highest significance value, and if not, said spacing between node levels being sufficient; and
  ii) otherwise determining whether $p(n_{j+1}) > p(n_j)$ at node level $n_j$, and if so retaining node level $n_{j+1}$ and eliminating node level $n_j$, otherwise retaining node level $n_j$ and eliminating node level $n_{j+1}$; and
D) generating node set N" having said selected minimum allowable spacing.

17. The system of claim 10, wherein post-processing said set of nodes N to obtain a desired lattice size comprises adding at least one node between two of said selected nodes wherein a same number of nodes levels is required along a $k^{th}$ dimension.

18. The system of claim 17, wherein adding at least one node between two of said selected nodes comprises:
wherein M is a number of nodes selected, node $n_j$, j=1, 2, ..., M,
wherein $P_k$ is a size of an input look-up table in said $k^{th}$ dimension such that $P_k$ M makes a lattice of size $P_1 \times P_2 \times P_3$,
wherein $n_1$ through $n_N$ are sorted scalar values of nodes along said $k^{th}$ dimension, with $N < P_k$,
A) adding boundary values $n_{min}$ and $n_{max}$ to node set N to obtain node set N';
B) repeating, for each node in node set N", until $n^* = n_M$:
  i) determining node $n^* = (n_j\, n_{j+1})/2$; and
  ii) inserting node $n^*$ between nodes $n_j$ and $n_{j+1}$; and
C) generating a node set N''' having a final lattice of size:

$$\overset{m}{\underset{j=1}{L}} = \Pi P_k.$$

* * * * *